(12) United States Patent
Dustin et al.

(10) Patent No.: US 11,621,101 B2
(45) Date of Patent: Apr. 4, 2023

(54) CONDUCTIVE COMPOSITES

(71) Applicant: The Boeing Company, Chicago, IL (US)

(72) Inventors: Ashley M. Dustin, Los Angeles, CA (US); Andrew P. Nowak, Los Angeles, CA (US); Xin N. Guan, Monterey Park, CA (US); Adam F. Gross, Santa Monica, CA (US); Richard E. Sharp, Weldon Spring, MO (US)

(73) Assignee: THE BOEING COMPANY, Chicago, IL (US)

( * ) Notice: Subject to any disclaimer, the term of this patent is extended or adjusted under 35 U.S.C. 154(b) by 56 days.

(21) Appl. No.: 17/354,011

(22) Filed: Jun. 22, 2021

(65) Prior Publication Data
US 2021/0313088 A1    Oct. 7, 2021

Related U.S. Application Data

(63) Continuation of application No. 15/851,310, filed on Dec. 21, 2017, now Pat. No. 11,075,021.

(51) Int. Cl.

| | | |
|---|---|---|
| *H01B 1/22* | (2006.01) | |
| *C08G 18/75* | (2006.01) | |
| *C08G 18/24* | (2006.01) | |
| *C08G 18/69* | (2006.01) | |
| *C08G 18/10* | (2006.01) | |
| *C08G 18/38* | (2006.01) | |
| *C08K 3/105* | (2018.01) | |
| *C08K 3/11* | (2018.01) | |

(Continued)

(52) U.S. Cl.
CPC ............... *H01B 1/22* (2013.01); *C08G 18/10* (2013.01); *C08G 18/246* (2013.01); *C08G 18/3821* (2013.01); *C08G 18/69* (2013.01); *C08G 18/72* (2013.01); *C08G 18/758* (2013.01); *C08K 3/08* (2013.01); *C08K 3/105* (2018.01); *C08K 3/11* (2018.01); *C08K 5/175* (2013.01); *C08L 75/04* (2013.01); *C22C 7/00* (2013.01); *C22C 12/00* (2013.01); *C22C 28/00* (2013.01); *C08K 2003/0893* (2013.01); *C08K 2201/001* (2013.01); *C08L 2207/04* (2013.01)

(58) Field of Classification Search
CPC ..................................................... H01B 1/22
See application file for complete search history.

(56) References Cited

U.S. PATENT DOCUMENTS

| | | | |
|---|---|---|---|
| 4,147,669 A | 4/1979 | Shaheen et al. | |
| 2010/0155103 A1* | 6/2010 | Kamikoriyama | ........ H01B 1/22 252/514 |
| 2017/0218167 A1* | 8/2017 | Majidi | ...................... H01B 1/22 |

FOREIGN PATENT DOCUMENTS

| | | |
|---|---|---|
| CN | 104098795 A | 10/2014 |
| CN | 107452436 A | 12/2017 |

(Continued)

OTHER PUBLICATIONS

First Office Action issued by the Chinese Patent Office in application No. 201811553746.X dated Sep. 1, 2021.

(Continued)

*Primary Examiner* — Khanh T Nguyen
(74) *Attorney, Agent, or Firm* — McDonnell Boehnen Hulbert & Berghoff LLP

(57) ABSTRACT

Disclosed are conductive composites comprising a polymer, a conductor selected from metals and metal alloys, and a thickening agent.

30 Claims, 3 Drawing Sheets

(51) Int. Cl.
    *C08G 18/72*    (2006.01)
    *C08K 3/08*     (2006.01)
    *C08K 5/17*     (2006.01)
    *C08L 75/04*    (2006.01)
    *C22C 7/00*     (2006.01)
    *C22C 12/00*    (2006.01)
    *C22C 28/00*    (2006.01)

(56) References Cited

FOREIGN PATENT DOCUMENTS

| CN | 107488441 A | | 12/2017 | |
|---|---|---|---|---|
| JP | 107452436 A | * | 12/2008 | ............... H01B 1/22 |
| WO | 2016056286 A1 | | 4/2016 | |

OTHER PUBLICATIONS

First Office Action issued by the Canadian Patent Office in application No. 3,026,553 dated Jan. 26, 2022.
Second Office Action issued by the Chinese Patent Office in application No. 201811553746.X dated Apr. 28, 2022.
"Polymer Chemistry", Caiyuan Pan, University of Science and Technology of China Press, Jul. 31, 1997, pp. 68-70.

* cited by examiner a)

b)

CONDUCTIVE COMPOSITES

CROSS-REFERENCE TO RELATED APPLICATIONS

This application is a continuation of U.S. application Ser. No. 15/851,310, filed Dec. 21, 2017, the disclosure of which is hereby incorporated herein by reference in its entirety.

FIELD

This disclosure relates to conductive composite materials, more specifically to conductive polymer composites, and to methods and compositions useful or preparing such materials.

BACKGROUND

A conductive composite, broadly defined, is any composite having significant electrical or thermal conductivity. Such composites contain an electrically conducting phase dispersed in a polymeric resin. The unique properties of such composites make them technologically superior to or more cost effective than alternative materials in a variety of applications. As a result, conductive composites have a broad range of uses in areas such as telecommunications, power generation and distribution, defense, aerospace, medicine.

In the context of using conductive composites, conductivity is not only significant, but is typically a primary characteristic of the composite. The conductivity of the materials varies by use. For certain applications, composites that have an effective sheet resistance of less than 100 Ohm/sq are important.

Conductive composites are commonly manufactured by and/or properties are achieved by incorporating a polymeric material with conductive particles. To achieve sufficient conductivity, i.e., to reach percolation, high particle loadings, typically in excess of 45 volume %, are often needed. The polymers used with these particle loading levels are normally rigid materials. As a consequence, these particle loading levels result in conductive films and coatings that have properties such as elongation at break, tensile strength, and thermal stability, that make them inappropriate or difficult to use. Solutions to this problem that employ liquid metal suffer from leakage of the metal from the polymer matrix.

Therefore, there is a need for composites that are conductive, avoid leakage of the metal from the polymer, and have characteristics that permit a wide variety of uses under different environmental conditions, i.e., elongation, tensile strength, and thermal stability.

SUMMARY

This disclosure provides a convenient solution to the problems identified above. In a broad aspect, this disclosure provides a conductive composite comprising a polymer and an electrically conductive network stably and homogeneously and/or continuously entrapped within the polymer, the network comprising a conductor having a melting point below about 60° C. and a compound or metal that does not alloy with the conductor. The compound or metal that does not alloy with the conductor is referred to herein as a thickening agent.

In one aspect, this disclosure provides a conductive composite comprising a polymer, a conductor selected from metals and metal alloys having a melting temperature below about 60° C., and a thickening agent.

The conductive composites of this disclosure are capable of carrying a high metallic content and still exhibit excellent elasticity. In the conductive composites of this disclosure, the conductor is uniformly or homogeneously distributed throughout the polymer matrix.

In another aspect, this disclosure provides a composition comprising a metal or metal alloy having a melting temperature below about 60° C. and an organic thickening agent.

In another aspect, this disclosure provides a composition comprising a di- or polyisocyanate, a conductor selected from metals and metal alloys having a melting temperature below about 60° C., and a thickening agent.

In yet another aspect, this disclosure provides a composition comprising a polyol, i.e., hydroxy-containing or hydroxyl-rich prepolymer, a conductor selected from metals and metal alloys having a melting temperature below about 60° C.; and a thickening agent.

In still another aspect, this disclosure provides a composition comprising a polyol and a metal or metal alloy having a melting temperature below about 60° C.

Yet another aspect of this disclosure provides methods for preparing a conductive composite.

In one aspect, the methods for preparing a conductive composite comprise combining an isocyanate composition comprising:
 (a) a di- or polyisocyanate;
 (b) a conductor selected from metals and metal alloys having a melting temperature below about 60° C.; and
 (c) a thickening agent;
with a polyol or a diamine to form a mixture; and allowing the mixture to cure to form the conductive composite.

Still another aspect of this disclosure provides a conductive composite comprising an elastomer, a conductor selected from metals and metal alloys having a melting temperature below about 60° C., and a thickening agent, wherein the conductive composite exhibits a minimum sheet resistance of less than 100 Ohm/sq, an elongation greater than or equal to 50%, and a tensile strength greater than or equal to 3 MPa.

In addition, this disclosure provides a conductive composite comprising an elastomer, a conductor selected from metals and metal alloys having a melting temperature below about 60° C., and a thickening agent.

This disclosure also provides a substrate carrying a layer of a conductive composite, wherein the conductive composite comprises a polymer, a conductor selected from metals and metal alloys having a melting temperature below about 60° C., and a thickening agent.

This disclosure further provides a method for preparing a substrate carrying a layer of a conductive composite, comprising heating the conductive composite of claim 1 and applying it to a substrate.

In another aspect, this disclosure provides a method for shielding an electrical component from electromagnetic radiation or interference, the method comprising providing a conductive composite between a source of electromagnetic radiation and the electrical component.

The conductive composites disclosed herein can be rigid or flexible. In certain examples, the conductive composite is elastomeric, i.e., an elastomer.

The conductive composites of this disclosure are made by combining a liquid metal, e.g., a gallium alloy, typically in the form of a paste, with a polymer or prepolymer, and if necessary curing the prepolymer or polymer.

In the composites disclosed herein, the paste has the following functions: providing conductivity without unnecessary rigidity; and increased the viscosity and flow properties of the conductor to prevent leakage thereof when the composite is being manufactured or used.

This disclosure also provides liquid metallic pastes, typically pastes comprising a gallium alloy, which exhibiting a loss modulus greater than the storage modulus, i.e., have a tan delta greater than 1.

DETAILED DESCRIPTION

Figure 1:
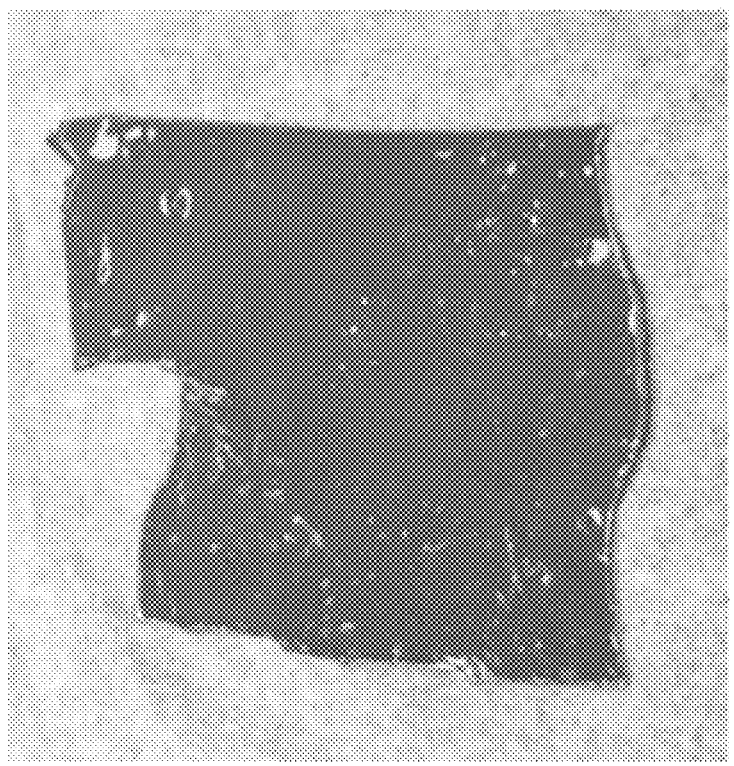
FIG. 1 shows photographs of the paste composition (panel (a)) and the conductive composite (panel (b)) produced in Example 1. The paste is made using a gallium ahoy containing 61.0% Ga, 25.0% In, 13.0% Sn, and 1.0% Zn by weight and maltol. The conductive composite contains the paste and a thermoplastic polyurethane.
Figure 1:

The term "alkyl" as used herein denotes a linear or branched acyclic alkyl group containing from 1 to about 20 carbon atoms. In some examples, alkyl is a lower alkyl having from 1 to 10 carbons atoms, or more narrowly from 1 to 6 carbon atoms or even more narrowly from 1 to 3 carbon atoms. Examples of lower alkyl moieties include, but are not limited to methyl, ethyl, n-propyl, isopropyl, n-butyl, isobutyl, sec-butyl, and tert-butyl. Examples of 10-20 carbon atoms alkyl groups include lauryl and stearyl groups.

The term "cycloalkyl" as used herein denotes a cyclic alkyl group containing from 2 to about 8 carbon atoms. In some examples, cycloalkyl has from 3 to 6 carbons atoms, or more narrowly from 4 to 6 carbon atoms or even more narrowly from 5-6 carbon atoms. Examples of cycloalkyl moieties include, but are not limited to cyclopropyl, cyclobutyl, cyclopentyl, and cyclohexyl.

As used herein, the term "alkylene" refers to a bivalent acyclic hydrocarbon group having, for example, from 1-6 carbon atoms, and is represented by the formula:— $(C_nH_{2n})$—.

As used herein, the term "cycloalkylene" refers to a bivalent cyclic hydrocarbon group having, for example, from 3-8 carbon atoms, and is represented by the formula —$(C_nH_{2n-2})$—.

As used herein, the term "urethane linkage" means a group of the formula:

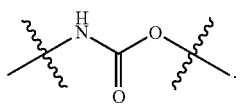

As used herein, the term "urea linkage" means a group of the formula:

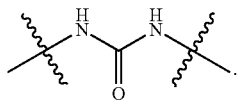

By 'does not substantially leak' as used herein is meant that less than about 10% of the conductor by volume leaks from the composite at 50% elongation.

As noted above, this disclosure provides a convenient solution to the problems encountered previously in making conductive composites. The conductive composites disclosed herein comprise a polymer and an electrically conductive network stably and homogeneously and/or continuously entrapped within the polymer, the network comprising a conductor having a melting point below about 60° C. and a compound or metal that does not alloy with the conductor. These conductive composites can be made to be flexible or rigid, depending on the desired use. Importantly, the conductor does not leak or does not substantially leak from the composite upon when the composite is flexed or otherwise manipulated. Thus, the term "stably and homogeneously entrapped within the polymer" as used herein means that the conductor and the thickening agent are permanently held within the polymer and do not migrate within the composite or leak when the composite is used. In certain examples herein, the conductivity of the composite does not diminish over extended periods of time.

Further, without wishing to be bound by theory, it is believed that the metal and the thickening agent form the electrically conductive network within pores (free volume) created in the polymer during the curing process. In addition, again without wishing to be bound by theory, it is believed that the pores structure of the polymer can be considered to be open, which permits the resulting connectivity between different regions of the composite. The thickening agent cooperates with the conductor, i.e., he metal or metal alloy having a melting point below about 60° C., to retain the conductor within the pores. The combination of the thickening agent and the conductor can be considered a paste. As discussed below, the paste behaves more like a liquid than a solid, permitting the composite to be flexible and, e.g., to bend. Use of a conductor having a melting temperature below about 60° C. permits the formation of the paste and the formation of the electrically conductive network.

By "electrically conductive network" as used herein is meant an interconnected system that is capable of transferring electrons, i.e., creating an electrical current, between different regions of the composite.

As used herein, the term "flexible" refers to materials that are not rigid, i.e., materials that bend rather than break, and more particularly to materials having a Young's modulus (E) of less than about 10 gigapascals (GPa). In certain examples, "flexible" as used herein means a Young's modulus of less than about 2 GPa. In other examples, "flexible" as used herein means a Young's modulus of less than about 1 GPa.

As noted above, this disclosure provides a conductive composite comprising a polymer, a conductor selected from metals and metal alloys having a melting temperature below about 60"C, and a thickening agent.

The polymer can be a rigid polymer or the polymer can be an elastomer (elastomeric polymer). The elastomeric polymers herein can be thermoset elastomers or thermoplastic elastomers. Whether the polymer chosen for manufacturing the conductive composite is rigid or elastomeric will typically depend on the end use or the manner in which the composite is to be applied to a substrate. For example, where the ultimate use requires flexibility, the polymer will be an elastomer so that the conductive composite. In such situations, the composite may be referred to as a flexible conductive composite. Thermoplastic elastomers will be useful for the mode of manufacture involves molding or shaping the conductive composite to a desired configuration or while applying it to a substrate.

Thermoset elastomers useful for making the conductive composites disclosed herein include acrylic resins, polyesters and vinyl esters, phenolic resins, amine-functional resins, and furan resins.

The thermoset elastomers can also be made from epoxy functional resins, which can be homo-polymerized with anionic or cationic catalysts and heat, or copolymerized through nucleophilic addition reactions with multifunctional crosslinking agents which are also known as curing agents or hardeners.

The thermoset elastomer can also be a polyurethane, a polyurea, or a polymer having both urethane and urea linkages, i.e., a polyurethane-urea.

Thermoplastic elastomers useful in the conductive composites disclosed herein include thermoplastic elastomers comprising urethane linkages, urea linkages, or urethane and urea linkages, or elastomers formed from styrene-butadiene-styrene (SBS) rubber or thermoplastic polypropylene.

Suitable thermoplastic elastomers for use in making the conductive composites disclosed herein have viscosities of about 1000 to about 100,000 cP, or from about 1000 to about 25,000 cP, or from about 25,000 to about 50,000 cP, or from about 50,000 to about 75,000 cP, or from about 75,000 to about 100,000 cP under typical processing conditions. In certain examples, suitable thermoplastic elastomers for use herein have viscosities of from about 1000 to about 50,000 cP under typical processing conditions. As used herein, the term "typical processing conditions" includes temperatures of from about room temperature (about 25° C.) to about 200° C., or from about room temperature to about 100° C. Such thermoplastic elastomers are convenient for making flexible materials.

In certain examples, the conductive composite will optionally be flexible and will be formed from thermoplastic polymer, e.g., a thermoplastic elastomer. Suitable thermoplastic polymers, e.g., thermoplastic elastomers, include polyurethanes formed by the reaction of a di- or polyisocyanate and a polyol reactant selected from siloxanes, fluorosiloxanes, perfluoropolyethers, polyethers, polyesters, polybutadiene-based polyols, polycarbonate-based polyols, and combinations thereof.

In certain examples, a di- or polyisocyanate used to manufacture the conductive composite will be a prepolymer composition made by reacting a hydroxyl-containing molecule, e.g., a dial or a polyol, or an amine-containing molecule, e.g., a diamine, with an excess of a di- or polyisocyanate. The resulting prepolymer includes urea and/or urethane linkages and terminal isocyanate groups. The isocyanate groups in the prepolymer are then utilized in a subsequent reaction with additional diamine or hydroxyl-containing molecules to form the thermoplastic elastomer.

In an example, the conductive composite comprises a thermoplastic polymer or elastomer formed by the reaction of a di- or polyisocyanate and a diamine. Particular examples of such conductive composites are flexible.

In certain examples, the conductive composite comprises a thermoplastic polymer or elastomer formed by the reaction of a di- or polyisocyanate and a polyol. Particular examples of such conductive composites are flexible.

The compositions and methods disclosed herein employ a conductor. Suitable conductors are metals and metal alloys having a melting temperature below about 60° C. hi certain examples, the conductor has a melting point below about 50° C., or below about 40° C., or below about 30° C., or below about 25° C., or below about 20° C. In certain examples, the melting point is sufficiently low for the alloy to be liquid when first combined with the thickening agent and to subsequently thicken when thoroughly mixed with the thickening agent.

In certain examples, the conductor is an alloy comprising at least about 50% by weight of gallium, bismuth, mercury, or combinations thereof. Suitable gallium alloys also include indium, tin, bismuth, phosphorus, lead, zinc, cadmium, antimony, or combinations thereof. Indium, tin, bismuth, phosphorus, lead, zinc, cadmium, antimony, or combinations thereof can be included to modify the melting temperature of the alloy as desired.

The conductor can include a minor amount of impurities, i.e., an amount that does not substantially change the rheological characteristics of the paste or the conductive and mechanical characteristics of the final conductive composite.

In an example the conductor used in the conductive composites disclosed herein is an alloy comprising indium and 50-97% by weight of gallium.

In another example, the conductor used to form the conductive composites disclosed herein is an alloy comprising about 15-30% by weight of indium, about 55-80% by weight of gallium, and at least one metal selected from tin and zinc. Suitable gallium alloys are commercially available from Indium Corporation.

Representative gallium alloys for use in the disclosed compositions include alloys with the following compositions and characteristics:

| Composition (weight %) | Liquidus (° C.) | Solidus (° C.) |
|---|---|---|
| 61.0 Ga/25.0 In/13.0 Sn/1.0 Zn | 7.6 | 6.5 |
| 66.5 Ga/20.5 In/13.0 Sn | 10.7 | 10.7 |
| 62.5 Ga/21.5 In/16.0 Sn | 16.3 | 10.7 |
| 75.5 Ga/24.5 In | 15.7 | 15.7 |
| 95 Ga/5 In | 25.0 | 15.7 |

The alloy can be selected to achieve the appropriate characteristics of the paste composition used to make the composite. A paste composition is preferably homogenous and made using the alloy and a thickening agent. The resulting paste composition is combined with either the isocyanate or polyol material prior to forming the composite.

The thickening agents used herein function as viscosity modifiers. The thickening agents do not dissolve the conductor or otherwise form solutions with the conductor; they remain solid when mixed with the conductor, but are wet by the conductor. The thickening agents are typically used as particles and the particle size dictates how readily the powder homogenizes with the conductor to form a paste. Typically, thickening agents that have higher surface areas will be better thickeners than agents with lower surface areas. Combinations of thickening agent and conductor, e.g., gallium alloy, are selected to achieve the appropriate wetting of the thickening agent and rheology or modulus of the paste. The particle sizes and quantities are selected to produce paste compositions have a tan delta value greater than 1, i.e., pastes that behave more like a liquid than a solid, permitting the resulting composite to be flexible.

In certain examples, the thickening agent comprises particles, e.g., rods or wires, of an inorganic thickening agent having an aspect ratio greater than 2, i.e., where the length is at least twice the width. Aspect ratio can be measured using a microscope.

In certain examples, the thickening agent comprises substantially spherical particles of an inorganic thickening agent having an average particle size of about 0.1-500 µm. Particles of this size range have sufficient surface area to function as thickening agents to form a paste with the conductor. In certain examples, the thickening agent comprises substantially spherical particles of an inorganic thickening agent having an average particle size of about 1-25 µm, or of about 25-50 µm, or of about 50-75 µm, or of about 75-100 µm, or of about 100-150 µm, or of about 150-200 µm, or of about 200-250 µm, or of about 250-300 µm, or of about 300-350 µm, or of about 350-400 µm, or of about 450-500 µm. In other examples, the thickening agent comprises substantially spherical particles of an inorganic thickening agent having an average particle size of about 50-150 µm. In certain examples, the particles of inorganic thickening agent having an average size of about 0.1-5 µm.

In an example, the thickening agent is an inorganic thickening agent comprising rods or wires having lengths of 0.01-10 mm. in certain examples, the rods of inorganic thickening agent have lengths of about 0.01-0.5 mm, or about 0.05-10 mm, or about 0.01-10 mm, or about 0.01-10 mm, or about 0.01-0.1 mm, or about 0.1-1 mm, or about 0.1-1 mm, or about 1-5 mm, or about 5-10 mm. Use of rods or wires contributes to the conductivity of the final composite to a larger extent than generally spherical particles. As a result, the amount of paste necessary to realize a certain degree of conductivity can be reduced. The reduction in the amount of paste used to make the composite can be accomplished by reducing either the amount of the conductor or the amount of the thickening agent.

In certain examples, the thickening agent comprises particles of an organic thickening agent having an average particle size of about 0.1-500 µm. In certain examples, the thickening agent comprises particles of an organic thickening agent having an average particle size of about 1-25 µm, or of about 25-50 µm, or of about 50-75 µm, or of about 75-100 µm, or of about 100-150 µm, or of about 150-200 µm, or of about 200-250 µm, or of about 250-300 µm, or of about 300-350 µm, or of about 350-400 µm, or of about 450-500 µm. In other examples, the thickening agent comprises particles of an organic thickening agent having an average particle size of about 50-150 µm. In certain examples, the particles of organic thickening agent having an average size of about 0.1-5 µm.

Suitable amounts of the thickening agent in the paste composition range from about 5-50% by volume of the paste. In certain examples, the amount of the thickening agent is from about 5% to about 10%, or about 5 to about 15%, or about 10 to about 20%, or about 15 to about 25%, or about 20 to about 30%, or about 25 to about 35%, or about 30 to about 45% by volume of the paste composition. Such amounts are convenient for producing paste compositions have a tan delta value greater than 1, i.e., pastes that behave more like a liquid than a solid, permitting the resulting composite to be flexible.

As explained above, the amount of thickening agent can be reduced when rods or wires are used as the thickening agents. Suitable amounts of rod or wire thickening agents in the paste range from about 2-40% by volume of the paste. In certain examples, the amount of the thickening agent is from about 2% to about 5%, or about 5 to about 10%, or about 10 to about 15%, or about 15 to about 20%, or about 20 to about 25%, or about 25 to about 30%, or about 30 to about 40% by volume of the paste composition.

In certain examples, the thickening agent used to make the conductive composite is an organic thickening agent. Suitable organic thickening agents include compounds having a melting point above 60° C., i.e., a temperature that will prevent the thickening agent from melting with the alloy, i.e., prior to or during manufacture of the composite. Examples of such compounds are maltol, phenol, naphthalene, 1-naphthol, 2-naphthol, and 4-pyridone. Where the organic thickening agent is a compound having a phenolic hydroxy group, the compound can react with the isocyanate groups of a di- or polyisocyanate via the hydroxy, but the reaction would be slower than the urethane or urea forming reactions. Used appropriately, such compounds can be used to modify the characteristics of the resulting polymer. Alternatively, the organic thickening agent can be graphite or carbon particles.

In certain examples, the thickening agent is an inorganic thickening agent or a combination of inorganic thickening agents. Suitable inorganic thickening agents include metal oxides such as titanium dioxide and zinc oxide, a metal having a melting point above 60° C., or a ceramic material. The metal is selected to have a melting point above 60° C. to prevent the thickening agent from melting prior to or during manufacture of the composite. Suitable metals include nickel, titanium, tungsten, stainless steel, copper, tin, or a combination thereof.

The conductive composites disclosed herein comprise from about 1-50% by volume of the conductor. In certain examples, the conductive composites include from 5 to 30% of the conductor. The amount of conductor will be dictated by the expected use of the composite. Typically higher conductivities will require larger percentages of the conductor. Of course, lower volumes of the conductor can be employed when the conductor has a relatively high conductivity. In certain examples, the amount of the conductor is from about 2% to about 10%, or about 5 to about 15%, or about 10 to about 20%, or about 15 to about 25%, or about 20 to about 30%, or about 25 to about 35%, or about 30 to about 45% by volume of the composition.

The thickening agent is a mixture of at least one organic thickening agent and at least one inorganic thickening agent. A mixture of organic and inorganic thickening agents can be used to modify the rheology or modulus of the paste.

The disclosure provides a paste composition comprising a metal or metal alloy having a melting temperature below 60° C. and an organic thickening agent. In another example, the paste composition comprises a metal or metal alloy having a melting temperature below 60° C., an organic thickening agent, and an inorganic thickening agent.

The paste compositions disclosed herein and useful for preparing the conductive composites have a loss modulus (G") greater than the storage modulus (G'), i.e., the paste compositions have a tan delta value greater than 1. Paste compositions of this disclosure therefore behave more like liquids than solids. The paste compositions of this disclosure have viscosities of from 500-100,000 Pa·s at 1 Hz when measured using a dynamic shear rheometer according to ASTM D7175.

The conductive composites disclosed herein are made by combining:
(i) a mixture of a paste composition and either (a) a di- or polyisocyanate or (b) a polyol or diamine with
(ii) either (a1) a polyol or diamine, or (b1) a di- or polyisocyanate (the counterpart reagent necessary to form a polyurethane and/or polyurea).

After combining these materials, the resulting mixture is permitted to cure to form the composite. Depending on the choice of starting materials, the composite will be rigid or flexible. It can also be thermoplastic, i.e., flexible when heated.

The paste composition is as described above and comprises a conductor selected from metals and metal alloys having a melting temperature below 60° C.; and a thickening agent.

In an example, the di- or polyisocyanate, i.e., (a) in the above mixture containing the paste composition, is an aromatic di- or polyisocyanate. A representative aromatic diisocyanate is methylene diphenyl diisocyanate (MDI).

In another example, the di- or polyisocyanate, i.e., (a) in the above mixture containing the paste composition, is an aliphatic or cycloaliphatic isocyanate. A representative aliphatic diisocyanate is hexamethylene diisocyanate (HMDI)

The polyols used to form conductive composites as disclosed herein include polyols having 2 or more hydroxy groups. Suitable polyols can be used as prepolymers that form polyurethanes when reacted with di- or polyisocyanates. Suitable polyols include polyether polyols and polyester polyols. Polyether polyols are typically used in materials where hydrolysis and microbial resistance are required, as well as in situations where extreme low temperature (e.g., about −68° C.) flexibility is important.

In certain examples, the conductive composite is made to include urea linkages. Such linkages are introduced into the polymer using a diamine compound(s). In certain examples, the diamine has the formula

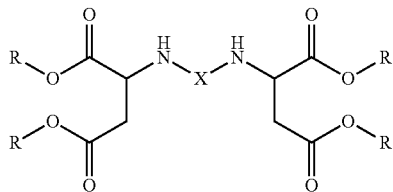

wherein
each R independently represents an alkyl group having from 1-20 carbon atoms; and
X represents
a straight or branched chain alkylene group having from 1 to 20 carbon atoms;
cycloalkyl having from 3-8 carbon atoms and optionally substituted with from 1-4 groups independently selected from $C_1$-$C_6$ alkyl; or a group of the formula —$R_1$-A-$R_2$—, wherein
A is straight or branched alkylene having 1-6 carbon atoms, and
$R_1$ and $R_2$ independently represent
phenyl optionally substituted independently with 1-4 $C_1$-$C_6$ alkyl groups, or
cycloalkylene having from 3-8 carbon atoms and optionally substituted with from 1-4 groups independently selected from $C_1$-$C_6$ alkyl.

The conductive composites disclosed herein can also comprise additional materials to impart other characteristics to the composites. For example, a thermo-oxidative stabilizer can be included into either the polyol, the di- or polyisocyanate, or the paste composition prior to forming the composite. Depending on the characteristics needed in the composite and the environment in which the composite will be deployed, the thermo-oxidative stabilizer can be a phosphate, iron oxide, phenolic antioxidant, metal passivator, or combination thereof.

The sheet resistivity of a particular conductive composite will depend on the ultimate use. For example, a minimum sheet resistance of less than 100 Ohm/sq is preferred when the composite is to be used to shield electrical components from electromagnetic radiation, e.g., to minimize electromagnetic interference that may disrupt or harm sensitive electronics.

In certain examples, the conductive composite comprises:
an elastomer;
a conductor selected from metals and metal alloys having a melting temperature below 60° C.; and
a thickening agent,
wherein the conductive composite exhibits a minimum sheet resistance of less than 100 Ohm/sq.

Sheet resistivity is a standard measurement and can be determined using a four point probe.

In certain examples, the conductive composite is flexible and has an elongation greater than about 50%. In other examples, the conductive composite is flexible and has an elongation greater than about 10%, or greater than about 20%, or greater than about 30%, or greater than about 40%. Flexible conductive composites of this disclosure preferably comprise a thermoplastic elastomer. In an example, the thermoplastic elastomer is a thermoplastic polyurethane.

In certain examples, the conductive composite has an elongation greater than about 50%. In other examples, the conductive composite has an elongation greater than about 10%, or greater than about 20%, or greater than about 30%, or greater than about 40%.

In certain examples, the conductive composite is flexible and has a tensile strength greater than or equal to 3 MPa. In certain examples, the conductive composite is flexible. In certain examples, the conductive composite has a tensile strength greater than or equal to 3 MPa.

In certain examples, the conductive composite has a density of between about 2 and 10 g/mL. In other examples, the conductive composite has a density between about 10 and 20/mL. In still other examples, the conductive composite has a density between about 1 and 5 g/mL, or between about 3 and 8 g/mL. In an example, the conductive composite has a density less than 7 g/mL. This parameter can readily be measured by determining the mass of a known volume or measuring the volume of water displaced by a known mass.

This disclosure also provides products, items, and structures comprising a substrate carrying a layer of a conductive composite disclosed herein, and in certain examples a flexible conductive composite as disclosed herein. Such products, items, and structures can be made by heating a thermoplastic or thermoset conductive composite as disclosed herein and applying it to a substrate.

Conductive composites disclosed herein can be made as follows:
A paste composition is prepared by combining the conductor having a melting point below about 60° C. with the thickening agent and mixing with a shear mixer at about 25-2500 rpm. In certain examples, the shear mixing to form the paste composition is carried out at about 25-125 rpm, or at about 125-250 rpm, or at about 250-400 rpm, or at about 400-700 rpm, or at about 700-1500 rpm, or at about 1500-2500 rpm. The resulting paste can be stored for future use.

The paste composition is subsequently combined with a prepolymer composition, and the resulting mixture is mixed thoroughly with a shear mixer, typically at less than about 100 rpm. A curing or cross-linking agent is then added to the mixture of prepolymer and paste and mixed for a period of time prior to allow the polymer to cure and entrap the paste composition within the polymeric matrix. If desired, during cure, the mixture of prepolymer and paste composition can be transferred to a mold of an appropriate shape.

The prepolymer can be a polyol or a di- or polyisocyanate. When the prepolymer is a polyol, the curing agent is normally a di- or polyisocyanate and the reaction generates a polyurethane. When the prepolymer is a di- or isocyanate, the curing agent can be a polyol or a diamine and the reaction generates a polyurethane or a polyurea.

In examples wherein the conductive composite comprises a polyurethane, it can be appropriate to form a polyurethane prepolymer. A polyurethane prepolymer composition can be made by combining a di- or polyol with an excess of a di- or polyisocyanate, optionally in the presence of a catalyst, and allowing the reactants to react, typically with mixing and heating to form the prepolymer. The prepolymer, can be stored for future use.

EXAMPLES

Material Sources

Krasol LBH-P2000 is obtained from Cray Valley and used as received. Desmophen NH 1220 is purchased from Covestro and used as received. Ga alloy (Indalloy 46L) is purchased from Indium Corporation and used as received. Maltol, titanium powder (size about 100 mesh), 4,4'-methylenebis(cyclohexyl isocyanate), mixture of isomers (HMDI), and dibutyltin dilaurate (DBTDL) are purchased from Sigma Aldrich and used as received. Stainless steel wires (3 mm×2 μm) are purchased from Intramicron and used as received. Polydimethylsiloxane (Sylgard® 184) is obtained from Dow Corning and used as received. Sugar cubes are purchased from local grocery store and used as received.

Example A: Preparation of Polyurethane Prepolymer (Part A

Hydroxyl-terminated polybutadiene (LBH-P2000, $M_n$=2100 g/mol, 50.00 g, 23.8 mmol) and HMD (19.65 g, 74.89 mmol) is placed in a round-bottom flask that contains an inlet for nitrogen and is equipped with an overhead stirrer (Teflon shaft and blade). The flask is placed in an oil bath at 100° C. and stirred at 175 rpm for 10 mins. DBTDL (500 ppm) catalyst is then added to the solution using a micropipette and the reaction is allowed to proceed for 2 h, forming a prepolymer (part A). Neat part A (no solvent) is poured into a glass jar and stored for future use.

Example 1

Preparation of paste: 18.51 g Ga alloy (Indalloy 46L) and 3.02 g maltol are mixed using a shear mixer for approximately 5 minutes at s 100 rpm.

Preparation of composite containing 21.8 volume % Ga alloy (paste): Part A (7.64 g) and Ga alloy-maltol paste (21.53 g) are mixed using a shear mixer for approximately 5 minutes at less than or equal to 100 rpm. NH1220 (2.56 g) is added to the resulting homogeneous mixture, and handmixed with a spatula for a minute. The mixture is then transferred to a Teflon mold and a blade applicator is used to cast a thin film.

Example 2

Preparation of paste: 27.23 g Ga ahoy (Indalloy 46L) and 5.86 g titanium powder (about 100 mesh) are mixed using a shear mixer for approximately 5 minutes at less than or equal to 100 rpm.

Preparation of composite containing 27.8 volume % Ga alloy (paste): Part A (8.15 g) and Ga alloy-Ti paste (33.09 g) are mixed using a shear mixer for few minutes at less than or equal to 100 rpm. NH1220 (2.73 g) is added to the resulting homogeneous mixture, and handmixed with a spatula for a minute. The mixture is then transferred to a Teflon mold and a blade applicator is used to cast a thin film.

Figure 2:
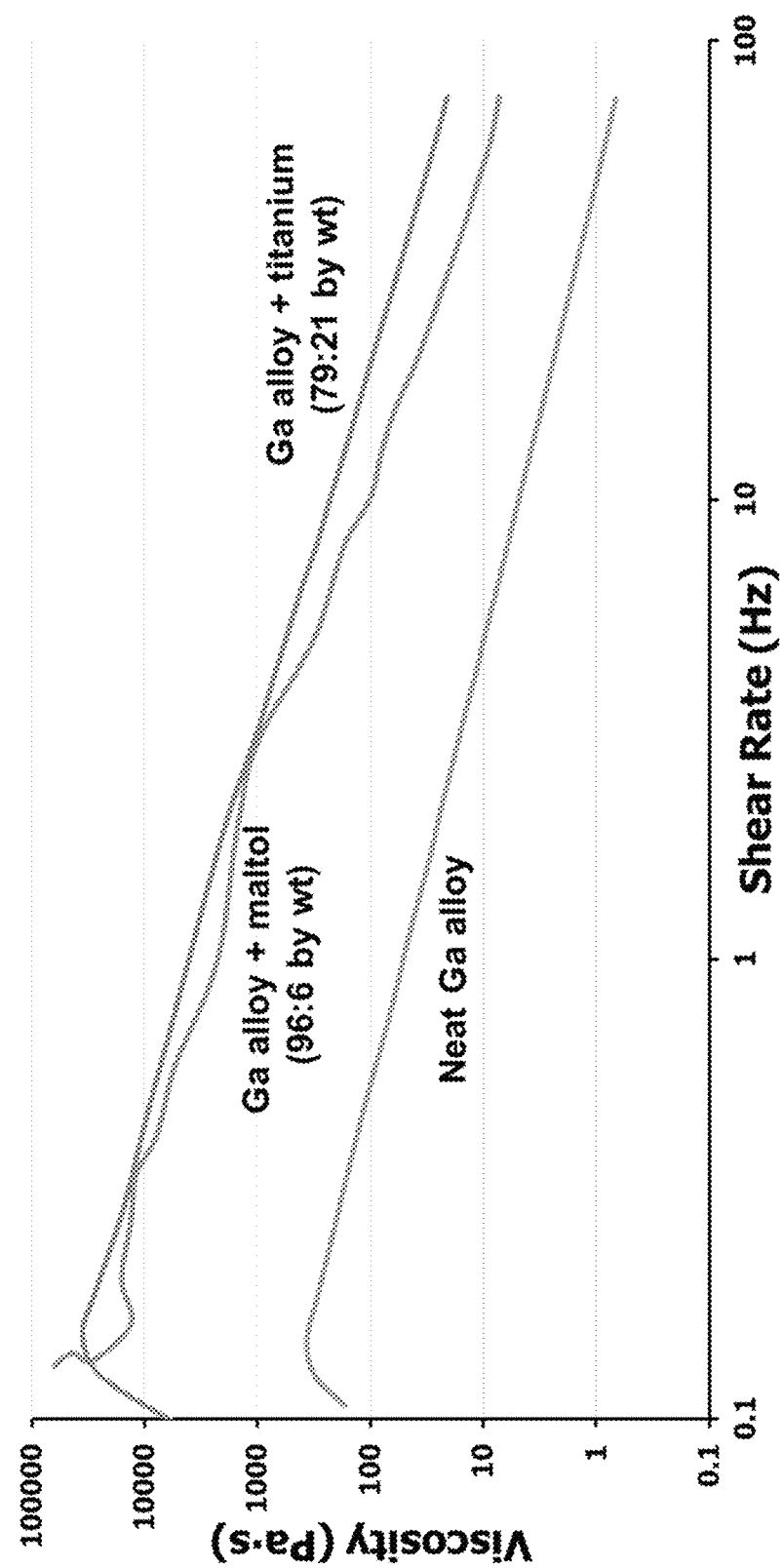
FIG. 2 is a graph showing viscosity versus shear rate for a paste composition made using an organic thickening agent, a paste composition made using an inorganic thickening agent, and a gallium ahoy without any thickening agent.

FIG. 2 shows the effect of adding a thickening agent on the viscosity (Pas) of a gallium alloy. Both inorganic and organic gallium-based pastes exhibit a viscosity about 1.5 times higher in magnitude than neat gallium ahoy.

Example 3

Preparation of paste: 29 g Ga alloy (Indalloy 46L) and 5.17 g titanium powder (about 100 mesh) are mixed using a shear mixer for approximately 5 minutes at less than or equal to 100 rpm. Stainless steel wires (0.52 g, 3 mm×2 μm) are then added into the paste and mixed under the same conditions.

Preparation of composite containing 29.1 volume % Ga alloy (paste): Part A (8.13 g) and Ga alloy-based paste (34.69 g) are mixed using a shear mixer for few minutes at less than or equal to 100 rpm. NH1220 (2.73 g) is added to the resulting homogeneous mixture, and handmixed with a spatula for a minute. The mixture is then transferred to a Teflon mold and a blade applicator is used to cast a thin, i.e., 1-2 mm thickness, film.

After cure, the composites described in Example 1, Example 2 and Example 3 are easily handled and cut into dog bones for mechanical testing. Table 1 below summarizes certain properties of the thermoplastic polyurethane control and Ga-based paste containing composites. The Example 2 composite, which contains 27.8 volume % gallium alloy, demonstrated elongation over 350% and an instant failure stress of about 14 MPa. Suitable devices for measuring these characteristics are commercially available from Instron, Norwood, Mass., USA. A slightly different paste composition and increasing the volume % gallium alloy to 29.1% resulted in a composite with 230% elongation and about 10 MPa instant failure stress.

TABLE 1

| Composite | Vol % Ga Alloy | % Elongation | Instant Failure Stress (MPa) |
|---|---|---|---|
| Thermoplastic Polyurethane (part A + NH1220) (n = 5) | 0 | 556 ± 31 | 60.2 ± 6.3 |
| Film obtained from Example 1 (n = 5) | 21.8 | 296 ± 16 | 9.5 ± 1.2 |
| Film obtained from Example 2 (n = 5) | 27.8 | 359 ± 36 | 13.7 ± 2.2 |
| Film obtained from Example 3 (n = 5) | 29.1 | 231 ± 42 | 9.67 ± 1.6 |

The attenuation of Example 1, Example 2 and Example 3 composites is summarized in Table 2. Attenuation improved when moving from organic to inorganic thickening agents. The combination of inorganic particle plus anisotropic metallic wire resulted in the highest electrical conductivity, −415 dB/in. All attenuation results reported are normalized to remove sample thickness as a variable.

TABLE 2

Electrical conductivity of elastomeric Ga-containing composites

| Composite | Vol % Ga Alloy | Attenuation/ Inch (dB/in) |
|---|---|---|
| Film obtained from Example 1 (n = 5) | 21.8 | −33 |
| Film obtained from Example 2 (n = 5) | 27.8 | −147 |
| Film obtained from Example 3 (n = 5) | 29.1 | −415 |

Comparative Example C-1

Silicone Sponge with Ga Alloy

A silicone sponge is prepared essentially according to a procedure described by from Liang et al. in J. Mater. Chem. C, 2017, 5 (7), 1586-1590, as follows:

20 g Sylgard part A and 2 g part B are mixed using a centrifugal mixer for 30 second at 2300 rpm, and followed by immersing 4 sugar cubes. The sugar cubes with polydimethylsiloxane (PDMS) mixture are then placed in a desiccator and degassed under vacuum for approximately 2 h. The sugar cubes with PDMS mixture are then cured at 65° C. for 3 h. Afterward, PDMS on the surface is wiped off to expose the sugar. The sugar is dissolved in 60° C. water with stirring. The PDMS sponges are obtained by drying at 100° C. for 2 h.

Preparation of sponge containing about 53 volume % Ga alloy: One silicone sponge is cut in half and immersed in 15 g Ga alloy. The container is then placed in a desiccator. Ga alloy liquid metal was filled into the PDMS sponge using vacuum for approximately 60 min.

Figure 3:
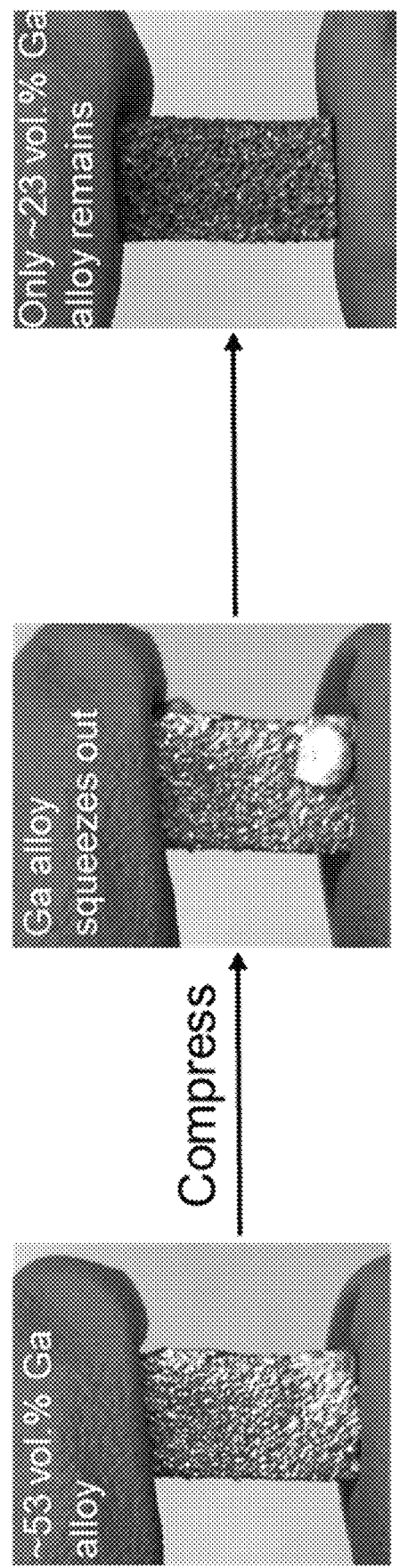
FIG. 3 is a series of photographs showing, in the direction of the arrow, the effect of compression on a silicone sponge filled with gallium alloy.

FIG. 3 shows the effect of compression on the Ga alloy-filled silicone sponge. As shown in FIG. 3, upon compression, Ga alloy leaks out of silicone sponge as a droplet of the liquid metal; after compression only about 23 volume % of the Ga alloy remains in silicone sponge. This is determined by weighing the sponge prior to and after compression.

Having described the invention in detail and by reference to specific examples thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention.

What is claimed is:

1. A composition comprising a polyol and a metal or metal alloy having a melting temperature below 60° C., wherein the polyol is a polyether polyol, perfluoropolyether polyol, or polycarbonate-based polyol.

2. A composition according to claim 1, further comprising a thickening agent.

3. A composition according to claim 2, wherein the thickening agent comprises particles of an inorganic thickening agent having an aspect ratio greater than 2.

4. A composition according to claim 2, wherein the amount of the thickening agent in the composition is about 5-50% by volume of the composition.

5. A composition according to claim 2, wherein the amount of the thickening agent in the composition is about 5% to about 10 by volume of the paste composition.

6. A composition according to claim 2, wherein the amount of the thickening agent in the composition is about 15 to about 25% by volume of the paste composition.

7. A composition according to claim 2, wherein the amount of the thickening agent in the composition is about 25 to about 35% by volume of the paste composition.

8. A composition according to claim 2, wherein the amount of the thickening agent in the composition is about 30 to about 45% by volume of the paste composition.

9. A composition according to claim 2, wherein the thickening agent is an organic thickening agent.

10. A composition according to claim 9, wherein the organic thickening agent has a melting point above 60° C.

11. A composition according to claim 9, wherein the organic thickening agent is maltol, phenol, naphthalene, 1-naphthol, 2-naphthol, 4-pyridone, graphite, carbon particles, or a mixture thereof.

12. A method for making a conductive composite, the method comprising combining a composition according to claim 1 with a polymer or prepolymer and curing the polymer or prepolymer.

13. A method according to claim 12, wherein the composition further comprises an inorganic thickening agent.

14. A method according to claim 12, where the composition is a paste having a loss modulus (G") greater than a storage modulus (G').

15. A method according to claim 12, wherein the composition further comprises a ceramic material.

16. A method according to claim 12, wherein the polyol is a polyether polyol.

17. A composition according to claim 1, wherein the composition is stably and homogeneously, continuously, or both homogenously and continuously entrapped within a polymer.

18. A composition according to claim 17, wherein the polymer comprises a thermoset or thermoplastic elastomer.

19. A composition according to claim 1 wherein the conductor is an alloy comprising at least about 50% by weight of gallium, bismuth, mercury, or combinations thereof.

20. A composition according to claim 1, wherein the conductor is an alloy comprising indium and 50-97% by weight of gallium.

21. A composition according to claim 1, wherein the conductor is an alloy comprising about 15-30% by weight of indium, about 55-80% by weight of gallium, and at least one metal selected from tin and zinc.

22. A composition according to claim 1, further comprising a ceramic material.

23. A composition consisting of
a polyol; and
a metal or metal alloy having a melting temperature below 60° C.,
wherein the polyol is selected from the group consisting of siloxanes, fluorosiloxanes, perfluoropolyethers, polyethers, polyesters, polybutadiene-based polyols, polycarbonate-based polyols, and combinations thereof,
wherein the composition is in the form of a paste.

24. A composition consisting of
an organic or inorganic thickening agent or a mixture thereof;
a polyol; and
a metal or metal alloy having a melting temperature below 60° C.,
   wherein the polyol is selected from the group consisting of siloxanes, fluorosiloxanes, perfluoropolyethers, polyethers, polyesters, polybutadiene-based polyols, polycarbonate-based polyols, and combinations thereof,
wherein the composition is in the form of a paste.

25. A composition according to claim 24, wherein the thickening agent or mixture thereof is present in the composition as particles.

26. A composition according to claim 25, wherein the particles of thickening agent have an average particle size of about 0.1-500 μm.

27. A composition according to claim 25, wherein the organic thickening agent has a melting point above 60° C.

28. A composition according to claim 25, wherein the organic thickening agent is maltol, phenol, naphthalene, 1-naphthol, 2-naphthol, 4-pyridone, graphite, carbon particles, or a mixture thereof.

29. A composition according to claim 25, wherein the inorganic thickening agent is nickel, titanium, tungsten, stainless steel, copper, or tin, or a combination thereof.

30. A composition according to claim 24, wherein the thickening agent is an inorganic thickening agent comprising rods or wires.

* * * * *